US010505986B1

(12) United States Patent
Messick et al.

(10) Patent No.: US 10,505,986 B1
(45) Date of Patent: *Dec. 10, 2019

(54) SENSOR BASED RULES FOR RESPONDING TO MALICIOUS ACTIVITY

(71) Applicant: Analyst Platform, LLC, Reston, VA (US)

(72) Inventors: Russell Scott Messick, Potomac Falls, VA (US); Jason Daniel Smith, Arlington, VA (US)

(73) Assignee: Analyst Platform, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/872,047

(22) Filed: Jan. 16, 2018

Related U.S. Application Data

(63) Continuation of application No. 15/413,807, filed on Jan. 24, 2017, now Pat. No. 9,871,826, which is a continuation of application No. 14/507,384, filed on Oct. 6, 2014, now Pat. No. 9,582,662.

(51) Int. Cl.
*H04L 29/06* (2006.01)

(52) U.S. Cl.
CPC .......... *H04L 63/20* (2013.01); *H04L 63/1425* (2013.01); *H04L 63/1441* (2013.01)

(58) Field of Classification Search
CPC ...... G06F 21/55; H04L 63/20; H04L 63/1441
USPC ......................................... 726/1, 22
See application file for complete search history.

(56) References Cited

U.S. PATENT DOCUMENTS

| | | | |
|---|---|---|---|
| 8,566,444 B1 * | 10/2013 | Yona .................... | H04L 47/2483 709/223 |
| 2004/0111632 A1 * | 6/2004 | Halperin ............... | G06F 21/552 726/24 |
| 2004/0123141 A1 * | 6/2004 | Yadav .................. | H04L 63/0227 726/23 |
| 2009/0070880 A1 * | 3/2009 | Harris .................... | G06F 21/552 726/25 |
| 2014/0173724 A1 * | 6/2014 | Lingafelt .............. | G06F 21/552 726/22 |

\* cited by examiner

*Primary Examiner* — Teshome Hailu
(74) *Attorney, Agent, or Firm* — Morris & Kamlay LLP

(57) ABSTRACT

Systems and techniques are provided for creating sensor based rules for detecting and responding to malicious activity. Evidence corresponding to a malicious activity is received. The evidence corresponding to malicious activity is analyzed. Indicators are identified from the evidence. The indicators are extracted from the evidence. It is determined that an action to mitigate or detect a threat needs to be taken based on the indicators and evidence. A sensor to employ the prescribed action is identified. Whether a sensor based rule meets a threshold requirement is validated. A configuration file used to task the sensor based rule to the identified sensor is created. The number of sensor based rule triggers is tracked.

20 Claims, 4 Drawing Sheets

SENSOR BASED RULES FOR RESPONDING TO MALICIOUS ACTIVITY

BACKGROUND

Maintaining the security of a computer system may require responding to many different types of malicious activity. Evidence of malicious activity may come from multiple sources, and may come in many different formats. The security of the computer system may be monitored by individuals, such as, for example, cyber analysts. Cyber analysts may review evidence of malicious activity to determine how to strengthen the security of a computer system. They may attempt to identify the targets of the malicious activity, the actors behind the malicious activity, unique characteristics of the malicious activity, and whether any countermeasures to mitigate the malicious activity are in place. The cyber analyst may also decide that some action needs to be taken in response to the malicious activity.

BRIEF SUMMARY

Systems and techniques disclosed herein may allow for the creation and management of sensor based rules for responding to malicious activity. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
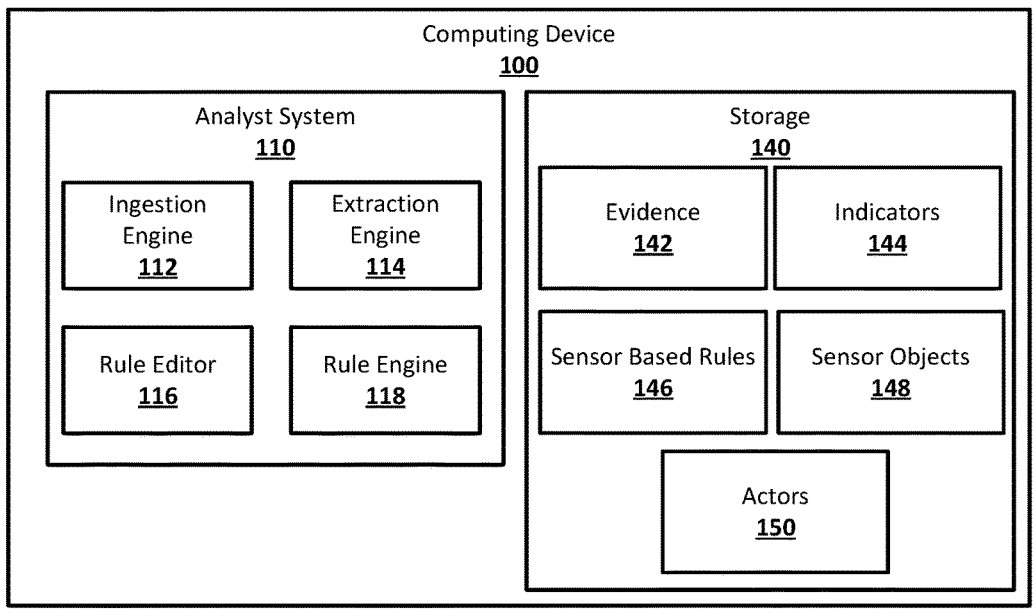
FIG. 1 shows an example system suitable for sensor based rules for responding to malicious activity according to an implementation of the disclosed subject matter

Sensor based rules for responding to malicious activity may be used to maintain the security of a network infrastructure, detecting and blocking malicious activity. Evidence of malicious activity against a computer system may be received at an analyst system running on any suitable computing device. The evidence may be received through automated ingestion, or through manual entry into the system on the computing device, for example, by a cyber analyst. Evidence may include any content that captures or describes activity related to computer system that may be deemed to be suspicious. This may include files directly related to the suspicious activity or reports documenting the suspicious activity. For example, a report on an intrusion into the computer system involving specific software tools may be evidence. Indicators of malicious activity may be extracted from the evidence. The indicators may include any information that may be used to uniquely identify a subsequent occurrence of the suspicious activity captured or described by the evidence. For example, the evidence may include a range of IP addresses from which the intrusion into the computer system originated. The range of IP addresses may be indicators of the malicious activity, as a subsequent network intrusion that is detected to originate from those IP addresses may be the same type of malicious activity as was captured or described in the evidence from which the IP address indicators were extracted. The computing device can be used to create a sensor based rule to detect or mitigate malicious activity based on indicators extracted from evidence. A sensor based rule may also be created directly from the evidence. The evidence may be linked to actors. The actors may be the party of parties responsible for the suspicious activity captured or described in the evidence. For example, an actor may be a hacking group responsible for a computer system intrusion. The actors may be automatically extracted from the evidence, and any indicators or sensor based rules created using the evidence may also be associated with the actors. A sensor based rule that has been created can then be tasked to one or more sensors, linking the sensor based rule to the sensors to one or more sensors it is tasked to. A sensor configuration may be created in order to task the sensor based rule to the one or more sensors. The sensor based rule may be validated to ensure that the sensor based rule conforms to the requirements of the sensor, and then the sensor may be tasked with the sensor based rule. The number of times the sensor based rule is triggered may be tracked. The sensor based rule may be triggered when activity occurs on the computer system of which the computing device is a part that matches the conditions specified in the sensor based rule. For example, receiving network traffic that originates from the range of IP addresses that were extracted as an indicator from the evidence may trigger a sensor based rule based on that range of IP addresses that has been tasked to a sensor that monitors the originating IP addresses of all network traffic entering the computer system.

Evidence of malicious activity against a computer system may be entered into an analyst system running on a computing device. The computing device may be any suitable computing device that permits access to the analyst system, such as, for example, a desktop, laptop, tablet, smartphone, or server system. The analyst system may run on any suitable computing device or computing devices. The evidence of malicious activity may be any content that captures or describes activity related to computer system that may be deemed to be suspicious. Evidence may include any known details of the malicious activity, including the exact nature of the malicious activity, date or dates the malicious activity occurred, actor or actors thought to be responsible, targets of the malicious activity, any known software, for example, malware, used during the malicious activity, including files used as droppers and dropped files, other files associated with the malicious activity, an attack pattern for the malicious activity, and a mitigation status for the malicious activity. The evidence may include any other information pertinent to the suspected malicious activity, such as IP addresses, MAC addresses, network traffic, domains and port numbers associated with the malicious activity, and packet capture data.

The evidence may be, for example, in the form of alerts, reports, packet captures, images, and query results. The alerts may be issued by any suitable organization in any suitable format, and may include structured data with several lines of text content that may identify the nature of a suspected malicious activity. The reports may be issued by any suitable organization in any suitable format, and may include structured and semi-structured data in any suitable file format and a few pages of text that may identify the nature of one or more incidents of suspected malicious activity or provide more detail on malicious activity that was the subject of a previous alert or report. For example, a report may be a PDF document including information about the suspected malicious activity. The query results may be in any suitable format, and may include both semi-structured and structure data, including binary data. The query results may be the result of queries initiated by, for example, a cyber analyst using the analyst system.

Evidence may be entered into the analyst system through automated ingestion or manual entry. For automated ingestions, the analyst system may include an automated ingestion engine implemented with any suitable hardware and software. The automated ingestion may include connectors which may be used for collecting evidence from one-to-many sources of evidence, such as authors or publishers of cyber incident reports. Sources of reports and alerts may be polled periodically, and the automated ingestion engine may check any new evidence that has not already been added to the analyst system. Any new evidence may be ingested into the analyst system through the connectors. An extraction engine of the analyst system may automatically analyze the evidence with a series of pattern matching rules to extract attributes of the evidence and of the suspected malicious activity in the evidence, such as activity dates, attack patterns, target or victim organizations, attack patterns, and attribution of the malicious activity to an actor. These attributes may be stored in the analyst system, where they may be later used as indicators or actors for the malicious activity.

Evidence may also be entered into the analyst system manually. For example, a cyber analyst may use a computing device to upload evidence, for example using an "Add Evidence" feature of a user interface for the analyst system. The cyber analyst may upload a file that may include the evidence, and may add attributes and metadata about the evidence file during the initial upload of the file, or later. The file may be, for example, a PDF including a report of a malicious activity that was not added to the analyst system by the automatic ingestion engine.

Any evidence added to the analyst system, either manually, or automatically, may be evaluated to ensure that the evidence is not already in the analyst system. This may prevent duplicative evidence from being added to the analyst system. For example, the source of evidence, and the hash of a file associated with the evidence, may be compared to evidence that has already been added to the analyst system. If there is a match, the data from the duplicate evidences may be normalized to ensure that only one entry for the evidence exists within the analyst system.

The analyst system may automatically extract, for example, using the automated extraction engine, attribution, or actor, information contained within any new evidence added to the analyst system. The actor or attribution may automatically be added as an attribute of the evidence. The actor or attribution for evidence may automatically be inherited by any indicator or rule that is created from the evidence. This may create a linkage between actor and indicator, as the actor for an indicator may be inherited from the evidence from which the indicator was extracted. This may also create a linkage between an actor and a rule, as the rule may inherit the actor from the indicator or evidence from which the rule was created.

Indicators may be extracted from the evidence in the analyst system. Once evidence is added to the analyst system, the evidence may be analyzed automatically by an extraction engine that is part of the analyst system. The extraction engine may analyze the evidence content, for example, a file uploaded with a report, using any suitable pattern matching rules to extract information such as, for example, IP addresses, domain names, file MD5 hashes, email addresses, and unique strings, such as GET, POST, and mutexes. The extraction engine may identify and extract from the evidence IP, email, and domain indicators that may be written in a way to not be functional as hyperlinks and MD5 hashes that have leading notations to specify what format the hash is in. For example, a report including a domain name or IP address may surround the '.' character in the domain name or IP address with brackets. The extraction engine may still extract the domain name or IP address as in indicator despite the inclusion of brackets in the text. Indicators may also be extracted from evidence manually, for example, by a cyber analyst. For example, a GET string in the format of a long URL may not be automatically extracted by the extraction engine. A cyber analyst may use the analyst system to manually extract the GET string as an indicator.

After indicators have been extracted from evidence, the indicators may be analyzed to determine if the indicators are already in the analyst system. For example, the analyst system may include an indicator management engine, which may analyze an indicator extracted from evidence to determine if the indicator has already been added to the analyst system. An indicator which has not previously been added to the analyst system may result in the creation of a new indicator object with values of the attributes for the indicator. The indicator may be associated with the evidence from which the indicator was extracted, which may create a link between the evidence and the indicator. For example, an IP address included in a report on malicious activity may be stored as an indicator which may be linked to the report. Additional information for an indicator may be determined through the performance of a series of queries by the analyst system to auto-populate the attributes of IP address and domain indicators. For example, an indicator that includes an IP address or domain name may have additional information added through the use of WHOIS query. The additional information may be, for example, the identity of the registrant of a domain name, including, for example, name and address and IP addresses associated with the domain name, or domain names and registrants associated with an IP address.

Each indicator extracted from an item of evidence may be presented to a user of the analyst system, for example, a cyber analyst. The cyber analyst may evaluate the indicator to determine if the indicator may not be useful. For example, indicators such as a domain name for a well-known website, IP addresses from a private IP space, or an MD5 hash of a null file, may be specified by the user to not be useful indicators. This may result in teaching the extraction engine of the analyst system to no longer extract the non-useful indicator from any other evidence, or may only result in the non-useful indicator not being used as an indicator for the evidence from which it was extracted. The non-useful indicator may also be removed from the analyst system if it has been previously extracted from other evidence.

When the indicator is added to the analyst system through the creation of a new indicator object, or when an existing indicator object is updated, the indicator object may inherit the actor attribution metadata or attribute from the evidence. For example, the evidence may be a report with text stating that the actor behind the malicious activity described in the report is known as "The Hacking Team." An IP address may be extracted from the evidence as an indicator, and used to create a new indicator object in the analyst system. The indicator object created for the IP address extracted from the evidence may inherit the actor attribution of "The Hacking Team" from the evidence.

An indicator may have been previously added to the analyst system, and there may already be an indicator object in the system for the indicator. The current indicator may be combined with the indicator object in the analyst system, which may have data from an original indicator that was used to originally create the indicator object. The current indicator and original indicator may be normalized into a single indicator object. The indicator object may be linked to both the evidence from which the original indicator was extracted and the evidence from which the current indicator was extracted. The indicator object may inherent actor information from the current indicator. If the actor from the current indicator is different from the actor for the original indicator, the indicator object may end up being attributed to more than one actor.

Before an indicator object is added or updated in the analyst system, the indicators may be normalized. For example, brackets around '.' characters may be removed from email addresses, domain names and IP addresses, the protocols and trailing directories of domain names may be removed, file sizes may have comma removed, and MD5 hashes may have the leading notation prefix removed.

The indicators in the analyst system may be used to create sensor based rules. A sensor based rule, or rule, may be able to detect or mitigate malicious activity taken against the computing system and network infrastructure based on indicators. For example, a rule may generate an alert when a sensor detects incoming traffic to the computing system that originates from an IP address that is an indicator, for example, that was in a report associating the IP address with malicious activity. A rule may also result in the dropping of packets, closing of ports or removal of computing systems from access by outside networks, or any other suitable activity that may mitigate the malicious activity. A rule created from an indicator, for example, by a cyber analyst using the analyst system, may be linked to the indicator. For example, a cyber analyst may use a user interface of the analyst system to select an indicator from which to create a rule. A rule may be created using more than one indicator, and may inherit the actor attribute from each indicator used to create the rule. Rules may also be created from the evidence in the analyst system. A rule created from evidence, for example, by a cyber analyst using the analyst system, may be linked to the evidence. For example, a cyber analyst may use a user interface of the analyst system to select evidence from which to create a rule.

A rule may be created for a specific type of sensor. The computing system may include a network infrastructure, which may have multiple types of intrusion detection and intrusion prevention systems, such as firewalls from different vendors, used to defend the computing system and associated network infrastructure against malicious activity. Each type of intrusion detection and intrusion prevention system may have its own sensors and associated syntax for writing rules for the sensors. The sensors may be able to detect, in an intrusion detection system, or mitigate, in an intrusion prevention system, a unique characteristic of a malicious activity taken against the computing device or network infrastructure. The syntax used for writing rules may vary, for example, based on the vendor for the intrusion detection or intrusion prevention system. A cyber analyst may select the sensor type a rule is being created for, and the analyst system may ensure that the resultant rule uses a syntax appropriate for the sensor, for example, based on the vendor responsible for the intrusion detection or intrusion prevention system of which the sensor is a part.

Rules may be created by a cyber analyst using the analyst system with a dynamic text based editor. The dynamic text based editor may allow the cyber analyst to write the rule without restrictions on the ability to enter text. Syntax errors made during the creation of the rule, for example, when the cyber analyst uses syntax that does not conform to the vendor's syntax for the sensors for which the rule is being written, may be visually identified in the text editor so that they may be addressed by the cyber analyst.

Rules may also be created using a content based editor. The content based editor of the analyst system may consider the nature of the rule, the sensor type the rule is being created for and the vendors responsible for the sensors of that type, and any evidence and indicators associated with the rule, to identify items within the evidence and indicators that may be added to the rule. These items may be presented to the user. For example, an indicator object in the analyst system may include an IP address. A cyber analyst may create a rule using the indicator object, and the content based editor may present the IP address as an item that may be used in the rule. The analyst system may identify the elements within the indicators or evidence that can be acted upon using rules. The analyst system may also identify the elements that it may be possible for the selected rule type to act upon. The evidence or indicator elements that can be acted on using rules and the elements that the selected rule can act on may be cross-referenced to determine active elements, which may be elements of the indicators or evidence based upon which the selected rule can take action. For example, if an rule is being created from an indicator that includes both an IP address and a malware file name, and the sensor associated with the rule can take action based on IP addresses, then the IP address may be an active element for the rule while the malware file name may not be an active element for the rule.

A user interface for the content based editor may identify active elements to the user, for example, the cyber analyst, in any suitable manner. For example, active elements may be identified with a marker, such as an asterisk, presented alongside text describing the active element in the user interface. Any active elements displayed in the user interface of the content based editor may be added to the current rule according to the vendor specified syntax for the sensors associated with the rule. A cyber analyst may be presented with a list of possible actions that can be taken based on the active element within the rule, and may choose an action to auto-populate the rule with syntactically correct code. For example, an indicator that is an IP address may be selected as a source IP address and its value may be auto-populated within the rule code for the rule. The evidence may be, for example, encoded packets, and the cyber analyst may use the user interface presentation of the encoded packets as an active element to either measure the packet length, or add the packets to the rule.

Rules may also be created by a cyber analyst with a form based editor. For example, the user interface of the analyst system may present a cyber analyst with drop-down menu items and text boxes that may be used to auto-generate a rule. The form options presented in the user interface may be based on the syntax for the rule, for example, based on the sensor type the rule is being generated for. The analyst system may cross references the evidence and indicator elements that can be acted upon and the rule elements that can act upon the evidence and indicators, dynamically updating the form based editor. Rules may be generated in a syntactically correct format based on the cyber analysts input into the form based editor.

A rule created with the analyst system may be tested against the evidence and indicators linked to the rule. Tests that may be run against the rule include vendor syntax compliance, best practices, packet capture network activity tests, OS audit log tests, and any other suitable types of test. The analyst system may include a rule engine, which may determine which tests can be run for a rule based on the rule type and the combined set of evidence and indicators linked to the rule. The results of testing rules may be presented on a user interface to a cyber analyst. The cyber analyst may use the test results to determine if a rule needs to be edited, for example, if the rule is not format compliant or does not adhere to best practices. Traffic tests may be used to indicate what parts of network traffic were detected, which may help identify noisy rules and rules that don't detect what the cyber analyst intended. Additional evidence or indicators may be linked to an existing rule, for example, to test if the rule will detect content within the evidence or indicator.

A rule created within the analyst system may be private, and may only be visible to the author of the rule until the author, for example, a cyber analyst, publishes the rule to the analyst system. Publishing the rule may make the rule visible to other users of the analyst system. A rule may need to be published before being tasked to a sensor.

After publishing, a published rule may be tasked to one or more sensors. Based on the rule type, the analyst system may present the cyber analyst with the sensors that adhere to the vendor syntax of the rule the cyber analyst is attempting to task. A cyber analyst may select a sensor and submit a request to a sensor owner for the sensor that the rule be tasked to the sensor. A sensor configuration may be created for the sensor and the sensor based rule, in any suitable format. For example, the sensor configuration may be a sensor configuration file in the language and syntax required by the sensor to which the sensor based rule will be tasked. When a rule is tasked to a sensor, a detasking date may be specified to ensure that the rule is not tasked to the sensor indefinitely. A request may also be submitted to a sensor owner to detask a rule from a sensor to which the rule has been previously tasked.

Sensor owners, for example, a party responsible for maintaining the intrusion detection and intrusion prevention systems, may choose to accept the request to task or detask a rule to or from a sensor. For example, if a new rule is created or updated and recommended for tasking a sensor, the sensor owner may evaluate the rule to determine if it is syntactically correct. The sensor owner may also run their own tests on a rule, for example, running sample network traffic against the rule out of band in a lab environment to ensure that real world traffic will not overload systems with sensors tasked to the rule.

A rule that has been tasked to one or more sensors within the analyst system may be linked and traceable to the sensors to which it has been tasked. The analyst system may also show which rules have been tasked to a specific sensor. The analyst system may store attributes for a rule, including the identity of the creator of the rule, whether the rule has been tested, whether the rule has passed form and syntax tests, whether the rule has passed best practices tests, whether the rule has passed packet capture tests, whether the rule has been published, and whether the rule has been tasked to any sensors. Other attributes stored by the analyst system for a rule may include when the rule was created, when the rule was list triggered on a sensor to which the rule is tasked, and when any actors linked to the rule. A rule may also be linked to actors based on the linkage between actors and the evidence or indicators from which the rule was created. The rule may be used to detect or block activities associated with the actors to which the rule is linked.

The analyst system may also track, and store as an attribute for the rule, the number of times the rule has been triggered on the aggregated set of sensors that are tasked with the rule. The analyst system may work with a security integration and event management system to determine the number of times a rule has been triggered. The analyst system may keep historical track of how often, and when, a rule is triggered. The analyst system may present, on a user interface, how often and when a rule is triggered, which may provide visibility into normal noise levels as well as abnormal peaks and valleys in the frequency with which the rule is triggered.

The rules in the analyst system may be searchable, and the analyst system may maintain version histories for the rules. The versions histories may be visible to any user, for example, cyber analyst, with proper access to the analyst system. The version history may include changes to the rule itself, as well as changes made to the tasking of the rule to sensors over time. Evidence, indicators, sensors, and actors may also be searchable within the analyst system, and may have version histories as well.

For example, the analyst system may automatically import evidence, which may be a report of malicious activity that includes an actor, "The Hacking Team", and several indicators including an IP address space, a domain name, and file names and MD5 hashes for dropper files and dropped files, for example, a dropper file that drops a Trojan horse. The indicators may be extracted from the report, and the actor "The Hacking Team" may be linked to the indicators. A cyber analyst may review the indicators in the analyst system, and may create a rule using the indicator of the IP address space. The rule may inherit the actor "The Hacking Team" from the indicator. After creating the rule, the rule may be tested, and then the cyber analyst may use the analyst system to task the rule to one or more sensors. The sensors may be, for example, part of an intrusion detection system for the computing system and network infrastructure the cyber analyst is seeking to protect from malicious activity. The sensors may monitor that originating IP addresses for traffic entering the computing system and network infrastructure. When the sensor detects traffic that originates at an IP address that is in the IP address space in the rule, the rule may trigger. The triggering of the rule may result in an alert being sent out, for example, to a cyber analyst, or some other action to mitigate or prevent malicious activity being taken, such as dropping the packets whose origin IP addresses triggered the rule. The number of times the rule is triggered may be monitored, which may allow, for example, a cyber analyst to gauge the frequency of the malicious activity against the computing system and network infrastructure. The cyber analyst may view the linkage between the rule and the actor "The Hacking Team," and the linkage between rule and other indicators that were extracted from the evidence from which the IP address space was extracted.

Cyber analysts may use data gathered about the triggering of sensor based rules to identify trends in the types of malicious activity that may be occurring against a given organization or group, which may allow for the prioritization of mitigation activities. A cyber analyst may use the analyst system to investigate a particular actor, in order to determine who the actor attacks, what tools, techniques, and procedures the actors employ in their malicious activity, what rules exist in the analyst system to detect activity by the actor, and which sensors are tasked to detect and mitigate malicious activity from the actor.

FIG. 1 shows an example system suitable for sensor based rules for responding to malicious activity according to an implementation of the disclosed subject matter. A computing device 100 may include an analyst system 110 and a storage 140. The computing device 100 may be any suitable computing device, such as, for example, a computer 20 as described in FIG. 5, for implementing the analyst system 110 and the storage 140. The computing device 100 may be a single computing device, or may include multiple connected computing devices, and may be, for example, a laptop, a desktop, an individual server, a server farm, or a distributed server system. The computing device 100 may be part of a computing system and network infrastructure, or may be otherwise connected to the computing system and network infrastructure. The analyst system 110 may be any suitable combination of hardware and software on the computing device 100 and may include an ingestion engine 112, extraction engine 114, rule editor 116, and rule engine 118. The storage 140 may store evidence 142, indicators 144, and sensor based rules 146, sensor objects 148, and actors 150 in any suitable manner.

The ingestion engine 112 may be any suitable combination of hardware and software for retrieving and ingesting evidence, which may be stored as the evidence 142. The ingestions engine 112 may, for example, automatically retrieve alerts, reports, and query results related to suspected incidents of malicious activity against computer systems and network infrastructures. The ingestions engine 112 may, for example, poll external sources periodically for alerts and reports and to receive query results. The ingestion engine 112 may store any retrieved evidence with the evidence 142 in the storage 140. The evidence stored with the evidence 142 may also be retrieved manually, for example, by a cyber analyst using the analyst system 110 on the computing device 100.

The extraction engine 114 may be any suitable combination of hardware and software for extracting indicators from evidence. For example, the extraction engine 114 may be able to retrieve evidence stored with the evidence 142, identify and extract indicators from the evidence, and store the extracted indicators with the indicators 144. The extraction engine 114 may use any suitable pattern matching rules to extract information such as, for example, IP addresses, domain names, file MD5 hashes, email addresses, and unique strings, such as GET, POST, and mutexes, from evidence stored with the evidence 142. Indicators extracted by the extraction engine 114 may be presented to a user of the analyst system 110 for evaluation before being as an indicator object with the indicators 144.

The rule editor 116 may be any suitable combination of hardware and software for creating rules, for example, sensor based rules, from the evidence in the evidence 142 and the indicator objects in the indicators 144. The rule editor 116 may include, for example, a form based editor, a content based editor, and a dynamic text based editor. A user of the analyst system 110, for example, a cyber analyst, may use the rule editor 116 to create sensor based rules from the evidence in the evidence 142 and the indicator objects in the indicators 144. A sensor based rule may, for example, include a specific IP address space from which any packets that originate should result in an alert being generated. The rule editor 116 may also be used to edit sensor based rules already created and stored with the sensor based rules 146.

The rule engine 118 may be any suitable combination of hardware and software for testing sensor based rules from the rule editor 116 before the sensor based rules are stored with the sensor based rules 146. The rule engine 118 may, for example, test a sensor based rule for vendor syntax compliance and best practices, and using packet capture network activity tests. The sensor based rule may be edited with the rule editor 116, for example, if the rule engine 118 determines that the sensor based rule is not format compliant or does not adhere to best practices. Traffic tests may be used to indicate what parts of network traffic may be detected by the sensor based rule, which may help identify noisy rules and rules that don't detect what the rule was intended to detect. Rules that have been tested and verified by the rule engine 118 may be stored with the sensor based rules 146.

The sensors objects 148 may represent sensors that the sensor based rules 146 may be tasked to. For example, the sensor objects 148 may include data on various sensors available on intrusion prevention and detection systems to which a user of the computing device 100, for example, a cyber analyst, may request one of the sensor based rules in the sensor based rules 146 be tasked. The sensor objects 148 may include, for example, data regarding valid syntax for rules for the various sensors, which intrusion prevention and detections systems the sensors are part of, and the identity and contact information for the party who may handle tasking and detasking requests for the sensors.

The actors 150 may include actors extracted from the evidence stored with the evidence 142. For example, the extraction engine 114 may extract actors to store with the actors 150 from evidence that is to be stored with the evidence 142. The actors stored with the actors 150 may include parties responsible for malicious activity described in the evidence 142. For example, the actors 150 may include the names of, and other identifying information for, individuals, groups, or organizations.

Figure 2:
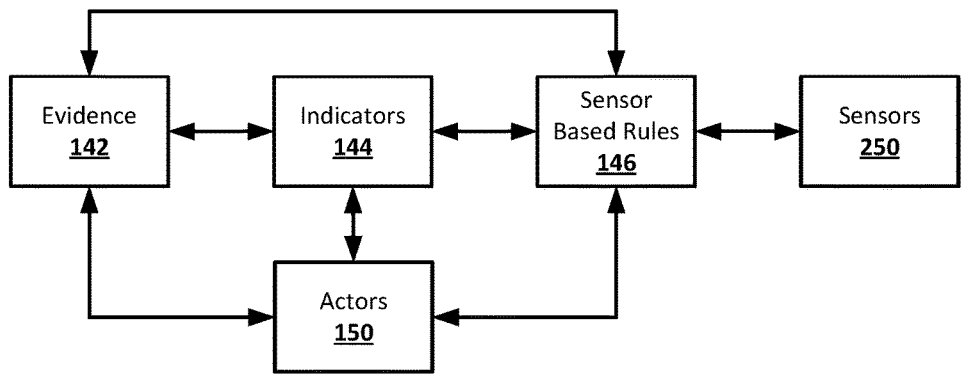
FIG. 2 shows an example of links between elements of creating a sensor based rule according to an implementation of the disclosed subject matter.

FIG. 2 shows an example of links between elements of creating a sensor based rule according to an implementation of the disclosed subject matter. There may be bi-directional linkage between evidence from the evidence 142, indicators from the indicators 144, sensor based rules from the sensor based rules 146, and actors 150. The actors 150 may be individuals, groups, organizations, or other suitable parties to which malicious activity can be attributed. The evidence, for example, ingested into the analyst system 110 by the ingestion engine 112, may include a description of a malicious activity and an actor or actors thought to be responsible for the malicious activity. When an indicator is extracted from evidence, for example, an item of evidence from the evidence 142, the indicator object that is created may inherit the actor from the item of the evidence. This may result in a bi-directional linkage between the item of evidence from the evidence 142, the indicator object stored with the indicators 144, and the actor from the actors 150 that was extracted from the evidence 142. The bi-directional linkage may allow, for example, a user of the analyst system 110 to determine all of the indicators from the indicators 144 linked to a specific actor, all of the actors linked to a specific indicator, all of the indicators linked to a specific item of evidence, all of the actors linked to a specific item of evidence, and all items of evidence linked to a specific indicator. For example, one of the indicator objects in the indicators 144 may be linked to multiple items of evidence, as the indicator may be common to a number of malicious activity from the same or multiple actors. The bi-directional linkage may allow a user, such as a cyber analyst, to view all of the items of evidence and actors related to the indicator object, which may assist the cyber analyst in evaluating the malicious activity and any necessary actions that may need to be taken to mitigate the threat from the malicious activity.

Sensor based rules from the sensor based rules 146 may be bi-directionally linked to sensors 250. The sensors 250 may be any suitable sensors for the intrusion detection and intrusion prevention. For example, the sensors 250 may include sensors that monitor the origin IP addresses of packets entering a network infrastructure, sensors that monitor file names of files being downloaded by computing devices within the network infrastructure, sensors that monitor IP addresses being accessed by a computing device within the network infrastructure, sensors that monitor login attempts to password protected computing device within the network infrastructure, and so on. A sensor based rule may be tasked to a sensor from the sensors 250, linking the sensor and the sensor based rule. The bi-directional linkage may, for example, allow a user of the analyst system 110 to view all of the sensor based rules from the sensor based rules 146 that have been tasked to a particular sensor.

Figure 3:
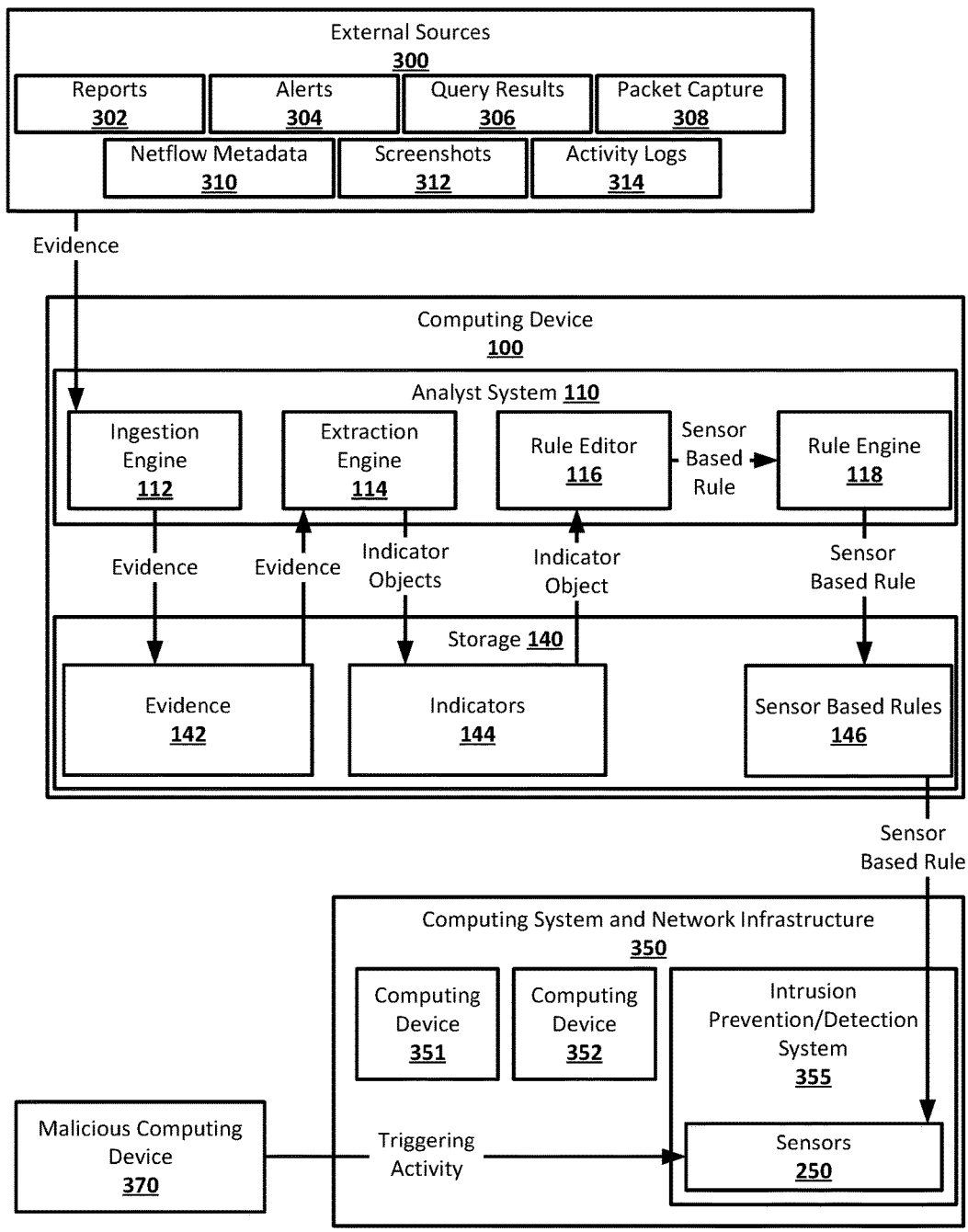
FIG. 3 shows an example arrangement for creating and managing sensor based rules for responding to malicious activity according to an implementation of the disclosed subject matter.

FIG. 3 shows an example arrangement for creating and managing sensor based rules for responding to malicious activity according to an implementation of the disclosed subject matter. The ingestions engine 112 of the analyst system 110 may access evidence from external sources 300. The external sources 300 may be, for example, other computing devices which may host reports 302, alerts 304, packet capture 308, netflow metadata 310, screenshots 312, activity logs 314, and provide query results 306 to queries that originate from the analyst system 110. The evidence from the external sources 300 may include, for example, descriptions of suspected incidents of malicious activity taken against computer systems and network infrastructures, including suspected actors who may be responsible for the malicious activity and other information, such as IP addresses, domain names and file names and MD5 hashes, associated with the malicious activity. The evidence from the external sources 300 may be stored with the evidence 142 in the storage 140 of the analyst system 110. For example, the ingestion engine 112 may retrieve a report 302 from the external sources 300 that may indicate that a party known as "The Hacking Team" engaged in malicious activity against a computer system by attempting to gain unauthorized access to a password protected computing device using a buffer overflow attack originating from a specific IP address.

The extraction engine 114 may analyze the items of evidence from the external sources 300 that was stored with the evidence 142 to identify and extract indicators. The indicators extracted from the evidence may be stored as indicator objects with the indicators 144. Indicators may be any suitable information that may be used to identify a future occurrence of the malicious activity described in the evidence, including, for example, originating IP address, file names and MD5 hashes of files, domain names, traffic patterns, packet capture data, GET and POST string, and so on. For example, the extraction engine 114 may extract indicators such as the originating IP address for the brute force attack, packet capture data for the packets used for the buffer overflow attack, and a POST string used in the buffer overflow attack. The indicators may be stored as indicator objects, and may be linked to the evidence from which they were extracted. Each indicator may inherit the actor from the evidence from which the indicator was extracted. For example, the originating IP address, packet capture data, and POST string indicators may inherit the actor "The Hacking Team" from the evidence that was ingested by the ingestion engine 112.

The rule editor 116 may be used to create a sensor based rule using an indicator object from the indicators 144. A sensor based rule may specify a particular indicator or indicators from an item of evidence that a sensor should monitor for, and an action to take in the event that a triggering indicator is detected. For example, a user of the analyst system 110 may use the rule editor 116 to create a sensor based rule indicating that an alert should be generated whenever incoming network traffic is detected that originates from the IP addresses extracted from the evidence of the buffer overflow attack by "The Hacking Team." The sensor based ruled may be tested and validated by the rule engine 118. The rule engine 118 may perform various tests on the sensor based rule, for example, testing the sensor based rule for proper syntax and implementation of best practices. When the rule engine 118 has determined that the sensor based rule meets a threshold, the rule may be validated. The sensor based rule may be stored with the sensor based rules 146.

A sensor based rule from the sensor based rules 146 may be tasked to a sensor in the sensors 250 of the computing system and network infrastructure 350. The computing system and network infrastructure 350 may be any suitable number and arrangement of general computing devices, such as the computing devices 351 and 352, and network equipment, such as, for example, hardware and software firewalls, routers, switches, and hubs. For example, the computing system and network infrastructure 350 may be the computing devices and network for an organization or multiple organizations, and may be housed within one or more structures over any geographic region. The computing system and network infrastructure 350 may also include intrusion prevention/detection system 355, which may be any suitable hardware and software, including firewalls, that may be used to monitor and protect the computing system and network infrastructure 350, including the computing devices 351 and 352, against malicious activity such as the gaining of access to the any of the computing device 351 and 352 by unauthorized parties.

The intrusion prevention/detection system 355 may include the sensors 250, which may be any suitable sensors for monitoring activity on the computing system and network infrastructure 350, including incoming network traffic. The sensor based ruled may be tasked to one of the sensors 250. For example, a user of the analyst system 110 on the computing device 100, which may be a part of or separate from and connected to the computing system and network infrastructure 350, may request that the sensor based rule for generating an alert whenever network traffic originating from the IP address associated with the buffer overflow attack is detected be tasked to one of the sensors 250 that monitors the originating IP addresses of incoming network traffic. A party responsible for the sensors 250, for example, an operator of the intrusion prevention/detection system 355, may allow the request, tasking the sensor based rule to the sensor.

The sensor from the sensors 250 may monitor activity on the computing system and network infrastructure 350. When network activity, such as incoming traffic, includes characteristics that match an indicator that was used in a sensor based rule tasked to one of the sensors 250, the rule may trigger. For example, when a malicious computing device 370 with an IP address that matches the IP address that was an indicator of the buffer overflow attack sends network traffic to the computing system and network infrastructure 350, the sensor 250 tasked with the sensor based rule may detect the incoming network traffic. The IP address match may trigger the sensor based rule tasked to the sensor, resulting in the generation of an alert. The triggering of a sensor based rule may result in any other suitable action, including the dropping or rerouting of packets, the shutting off of access to certain parts of the computing system and network infrastructure 350 from outside networks, or other actions that may mitigate the threat from the malicious activity associated with the network activity that triggered the sensor based rule. The triggering of the sensor based rule may also be recorded, for example, by the analyst system 110.

Figure 4:
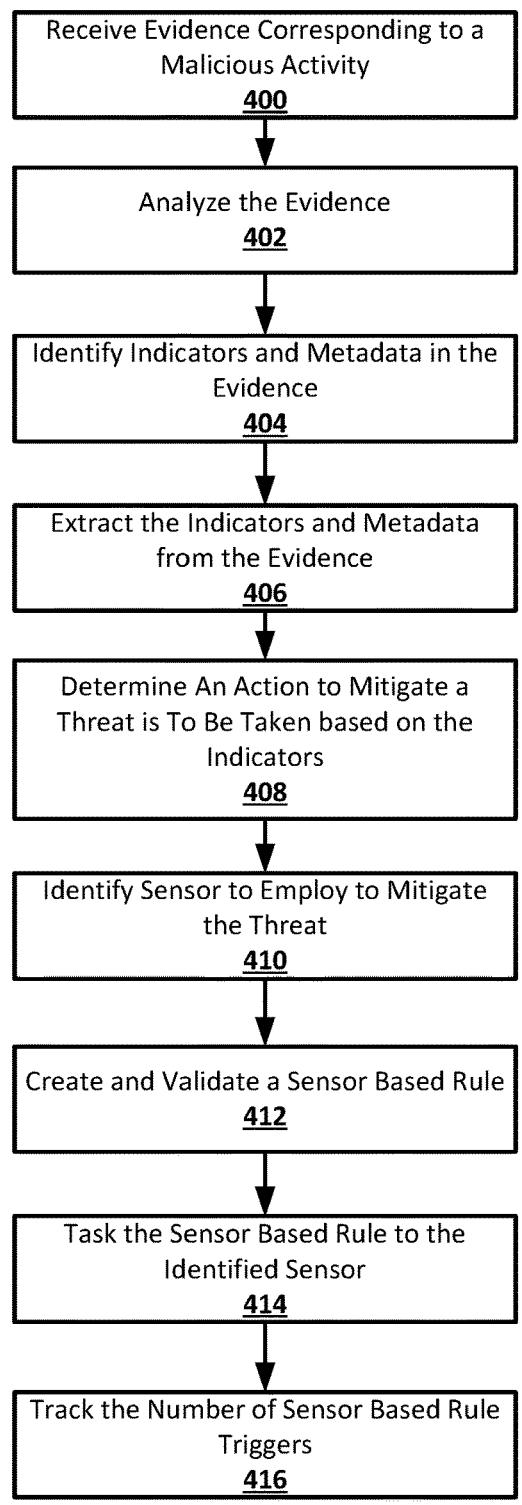
FIG. 4 shows an example of a process for creating and managing sensor based rules for responding to malicious activity according to an implementation of the disclosed subject matter.

FIG. 4 shows an example of a process for creating and managing sensor based rules according to an implementation of the disclosed subject matter. At 400, evidence corresponding to a malicious activity may be received. For example, the analyst system 110 may receive, through the ingestion engine 112, evidence of malicious activity that was taken against a computer system or network infrastructure. The evidence may be, for example, one of the reports 302 received from the external sources 300.

At 402, the evidence may be analyzed. For example, ingestion engine 112 may analyze one of the reports 302 received from the external sources 300. The evidence may be analyzed for example, to determine any actors that may be associated with the evidence and any indicators that may be included in the evidence that may allow for the detection of future malicious activity of the type described in the evidence.

At 404, indicators and metadata may be identified in the evidence. For example, the extraction engine 114 may identify IP addresses, domain names, file names, file MD5 hashes, POST and GET strings, and other indicators that may allow for the detection of future malicious activity of the type described in the evidence.

At 406, the indicators and the metadata may be extracted from the evidence. For example, the extraction engine 114 may extract the indicators from the evidence and store them as indicator objects with the indicators 144. The indicators extracted from the evidence may be linked to the evidence. For example, an IP address from the evidence may be stored as an indicator object, and may be linked to the evidence.

At 408, it may be determined that an action is to be taken to mitigate a threat based on the indicators. For example, the indicators extracted from the evidence by the extraction engine 114 may indicate that the malicious activity described in the report from which the indicators were extracted may be a threat to the computing system and network infrastructure 350 associated with the analyst system 110.

At 410, a sensor may identified to employ to mitigate the threat. For example, one of the indicators of malicious activity extracted from the evidence may be an IP address. A sensor from the sensors 250 that monitors the originating IP addresses incoming network traffic for the computing system and network infrastructure 350 may be identified as being able to detect the indicator of the malicious activity. The sensor may be used to mitigate the threat posed by the malicious activity.

At 412, a sensor based rule may be created and validated. For example, the rule editor 116 may be used to create a sensor based rule from one of the indicators in the indicators 144. For example, the IP address indicator extracted from the evidence may be used to create a sensor based rule that is triggered based on traffic from the IP address. The sensor based rule may be validated, for example, by the rule engine 118. The validation may ensure that the sensor based rule conforms to proper vendor syntax, implements best practices, and detects the intended network traffic.

At 414, the sensor based rule may be tasked to the identified sensor. For example, the analyst system 110 may be used to create a sensor configuration for the sensor based rule, in the form of, for example, a file, with the appropriate language and syntax for the sensor. The sensor based rule for the IP address indicator may be tasked, using the sensor configuration, to the identified sensor from the sensors 250 that monitors the originating IP addresses of incoming network traffic. Tasking the sensor based rule to the sensor may result in the rule being able to trigger whenever the sensor detects network traffic that includes the indicator used to create the sensor based rule.

At 416, the number of times the sensor based rule triggers may be tracked. For example, the sensor based ruled may trigger when the sensor from the sensors 250 to which the sensor based rule is tasked detects a condition that matches the indicator used to create the sensor based rule. For example, the sensor based rule created using the IP address associated with the evidence of malicious activity may trigger when the sensor to which the sensor based rule is tasked detects incoming network traffic that originates from that IP address. The number of times the sensor based rule is triggered may be tracked, and, for example, stored in the analyst system 110.

Figure 5:
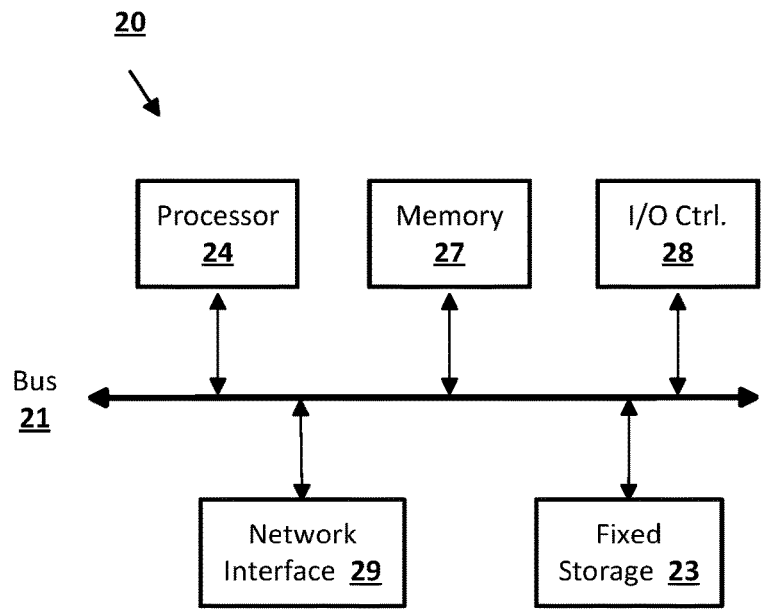
FIG. 5 shows a computer according to an embodiment of the disclosed subject matter.

Embodiments of the presently disclosed subject matter may be implemented in and used with a variety of component and network architectures. FIG. 5 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 6.

Many other devices or components (not shown) may be connected in a similar manner, such as document scanners, digital cameras, auxiliary, supplemental, or backup systems, or the like. Conversely, all of the components shown in FIG. 5 need not be present to practice the present disclosure. The components can be interconnected in different ways from that shown. The operation of a computer such as that shown in FIG. 5 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 6:
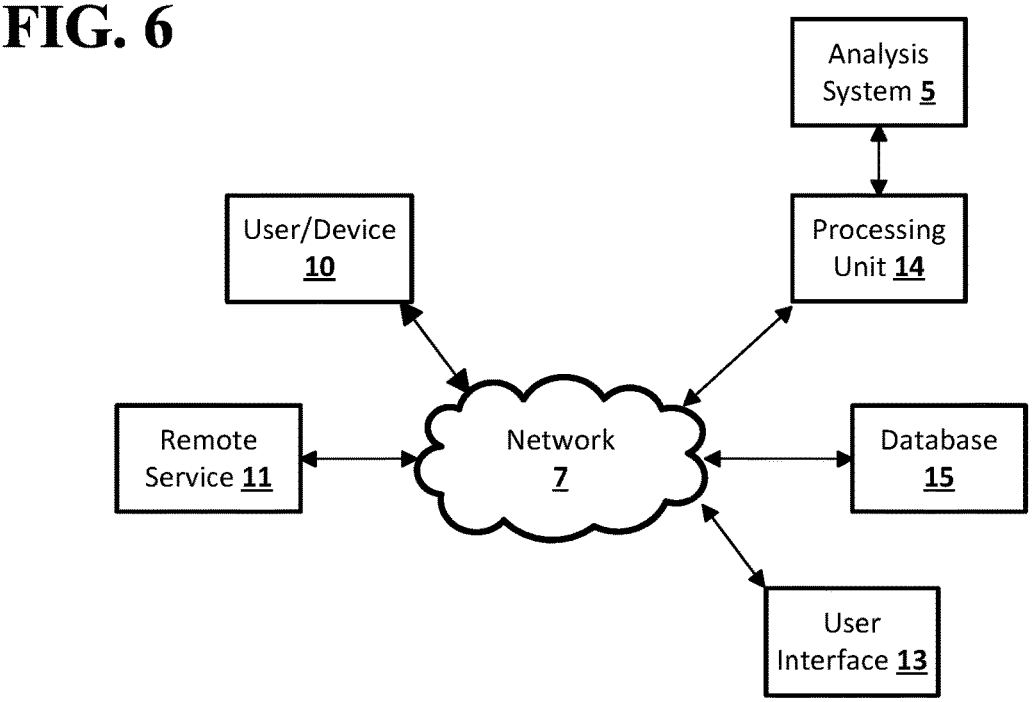
FIG. 6 shows a network configuration according to an embodiment of the disclosed subject matter.

FIG. 6 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

In situations in which the implementations of the disclosed subject matter collect personal information about users, or may make use of personal information, the users may be provided with an opportunity to control whether programs or features collect user information (e.g., a user's performance score, a user's work product, a user's provided input, a user's geographic location, and any other similar data associated with a user), or to control whether and/or how to receive instructional course content from the instructional course provider that may be more relevant to the user. In addition, certain data may be treated in one or more ways before it is stored or used, so that personally identifiable information is removed. For example, a user's identity may be treated so that no personally identifiable information can be determined for the user, or a user's geographic location associated with an instructional course may be generalized where location information is obtained (such as to a city, ZIP code, or state level), so that a particular location of a user cannot be determined. Thus, the user may have control over how information is collected about the user and used by an instructional course provider.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method comprising:
   receiving, at a computing device, an evidence corresponding to a malicious activity, wherein the evidence is received from an external computing device and is stored in a file by the computing device;
   extracting, by the computing device with an extraction engine, one or more indicators from the evidence by analyzing the contents of the file in which the evidence was stored;
   creating, with the computing device, a sensor based rule from the one or more indicators;
   identifying which sensor type to employ for mitigation based on the indicator type;
   determining that the sensor based rule adheres to a syntax associated with a sensor vendor of a sensor of the intrusion prevention or intrusion detection system that is of the identified sensor type, further comprising visually identifying syntax in the sensor based rule that does not conform to the syntax associated with the sensor vendor; and
   creating a sensor configuration for tasking the sensor based rule to the sensor of the intrusion prevention or intrusion detection system, wherein the sensor monitors one or more of the computer system and a network infrastructure to which the computer system is connected, and wherein the sensor is of the identified sensor type.

2. The method of claim 1, further comprising:
   determining whether associated sensor based rules exist based on historical data
   determining whether associated sensor based rules are tasked based on current security data.

3. The method of claim 1, further comprising:
determining that the sensor based rule adheres to the best practices specified by the sensor vendor.

4. The method of claim 1, further comprising determining that the sensor based rule will create no more than a threshold number of false positives.

5. The method of claim 1, further comprising:
monitoring the tasked sensor based rule; and
receiving one or more triggers associated with the sensor based rule.

6. The method of claim 5, further comprising:
determining that the one or more triggers is above a predetermined noise level; and
initiating an investigation if the one or more hits is above the predetermined noise level.

7. The method of claim 1, further comprising tracking the number of sensor based rule triggers.

8. The method of claim 1, further comprising identifying the sensor as being able to mitigate a threat, wherein the threat is based on the malicious activity.

9. A computer-implemented system for sensor based rules for responding to malicious activity comprising:
a storage; and
at least one computing device adapted to receive an evidence corresponding to a malicious activity, wherein the evidence is received from an external computing device and is stored in a file in the storage by the at least one computing device, extract one or more indicators from the evidence by analyzing the contents of the file in the storage in which the evidence was stored, create a sensor based rule from the one or more indicators, identify which sensor type to employ for mitigation based on the indicator type, determine that the sensor based rule adheres to a syntax associated with a sensor vendor of a sensor of the intrusion prevention or intrusion detection system that is of the identified sensor type, further comprising visually identifying syntax in the sensor based rule that does not conform to the syntax associated with the sensor vendor, and create a sensor configuration for tasking the sensor based rule to the sensor of the intrusion prevention or intrusion detection system, wherein the sensor monitors one or more of the computer system and a network infrastructure to which the computer system is connected, and wherein the sensor is of the identified sensor type.

10. The system of claim 9, wherein the at least one computing device is further adapted to determine whether associated sensor based rules exist based on historical data and determine whether associated sensor based rules are tasked based on current security data.

11. The system of claim 9, wherein the at least one computing device is further adapted to determine that the sensor based rule adheres to the best practices specified by the sensor vendor.

12. The system of claim 9, wherein the at least one computing device is further adapted to further to determine that the sensor based rule will create no more than a threshold number of false positives.

13. The system of claim 9, wherein the at least one computing device is further adapted to monitor the tasked sensor based rule and receive one or more triggers associated with the sensor based rule.

14. The system of claim 13, wherein the at least one computing device is further adapted to determine that the one or more triggers is above a predetermined noise level and initiate an investigation if the one or more hits is above the predetermined noise level.

15. A system comprising: one or more computers and one or more storage devices storing instructions which are operable, when executed by the one or more computers, to cause the one or more computers to perform operations comprising:
receiving, at a computing device, an evidence corresponding to a malicious activity, wherein the evidence is received from an external computing device and is stored in a file by the computing device;
extracting, by the computing device with an extraction engine, one or more indicators from the evidence by analyzing the contents of the file in which the evidence was stored;
creating, with the computing device, a sensor based rule from the one or more indicators;
identifying which sensor type to employ for mitigation based on the indicator type;
determining the sensor based rule adheres to a syntax associated with a sensor vendor of a sensor of the intrusion prevention or intrusion detection system that is of the identified sensor type, further comprising visually identifying syntax in the sensor based rule that does not conform to the syntax associated with the sensor vendor; and
creating a sensor configuration for tasking the sensor based rule to the sensor of the intrusion prevention or intrusion detection system, wherein the sensor monitors one or more of the computer system and a network infrastructure to which the computer system is connected, and wherein the sensor is of the identified sensor type.

16. The system of claim 15, wherein the instructions are operable, when executed by the one or more computers, to cause the one or more computers to perform operations further comprising:
determining whether associated sensor based rules exist based on historical data; and
determining whether associated sensor based rules are tasked based on current security data.

17. The system of claim 15, wherein the instructions are operable, when executed by the one or more computers, to cause the one or more computers to perform operations further comprising:
determining that the sensor based rule adheres to the best practices specified by the sensor vendor.

18. The system of claim 15, wherein the instructions are operable, when executed by the one or more computers, to cause the one or more computers to perform operations further comprising determining that the sensor based rule will create no more than a threshold number of false positives.

19. The system of claim 15, wherein the instructions are operable, when executed by the one or more computers, to cause the one or more computers to perform operations further comprising:
monitoring the tasked sensor based rule; and
receiving one or more triggers associated with the sensor based rule.

20. The system of claim 19, wherein the instructions are operable, when executed by the one or more computers, to cause the one or more computers to perform operations further comprising:
determining that the one or more triggers is above a predetermined noise level; and initiating an investigation if the one or more hits is above the predetermined noise level.

\* \* \* \* \*